US007534969B2

(12) United States Patent
Menzel

(10) Patent No.: US 7,534,969 B2
(45) Date of Patent: May 19, 2009

(54) CARRIER WITH A CABLE CHANNEL FOR AN ELECTRIC LAMP

(76) Inventor: Dietrich Menzel, Seehauser Strasse 43, 83324 Ruhpolding (DE)

( * ) Notice: Subject to any disclaimer, the term of this patent is extended or adjusted under 35 U.S.C. 154(b) by 953 days.

(21) Appl. No.: 10/514,917

(22) PCT Filed: Jun. 3, 2003

(86) PCT No.: PCT/EP03/05793

§ 371 (c)(1), (2), (4) Date: Nov. 17, 2004

(87) PCT Pub. No.: WO03/104714

PCT Pub. Date: Dec. 18, 2003

(65) Prior Publication Data

US 2005/0185411 A1 Aug. 25, 2005

(30) Foreign Application Priority Data

Jun. 5, 2002 (DE) ................................ 102 24 985

(51) Int. Cl.
*H02G 3/18* (2006.01)

(52) U.S. Cl. .................. 174/650; 174/117 F; 174/74 R; 362/391

(58) Field of Classification Search ................. 174/650, 174/117 F, 117 FF, 74 R; 362/391, 368
See application file for complete search history.

(56) References Cited

U.S. PATENT DOCUMENTS

| | | | | |
|---|---|---|---|---|
| 6,020,559 | A * | 2/2000 | Maeda | 174/117 F |
| 6,323,429 | B1 * | 11/2001 | Platz | 174/117 FF |
| 7,213,938 | B2 * | 5/2007 | Brondt et al. | 362/225 |
| 7,399,105 | B2 * | 7/2008 | Southard et al. | 362/391 |

FOREIGN PATENT DOCUMENTS

| | | | |
|---|---|---|---|
| DE | 295 19 441 | U | 3/1996 |
| DE | 297 11 973 | U | 11/1998 |
| FR | 2 747 178 | A | 10/1997 |

* cited by examiner

*Primary Examiner*—Dhiru R Patel
(74) *Attorney, Agent, or Firm*—Sughrue Mion, PLLC

(57) ABSTRACT

A carrier including a cable channel for an electric lamp. The carrier includes two flat covering layers and one middle layer. The middle layer includes two separate elements parallel to the axis of the cable channel, whose joint layer thickness and mutual distance correspond to the width or height of the cable channel. The three layers are glued or welded to each other.

6 Claims, 1 Drawing Sheet

CARRIER WITH A CABLE CHANNEL FOR AN ELECTRIC LAMP

BACKGROUND OF THE INVENTION

1. Field of the Invention

The invention concerns a mount with a wiring channel for an electric light. An elongated element, which supports a light at one end and is fastened to a fixed point like a wall, the ceiling of a room or a piece of furniture with the other end, is to be understood as mount here. The wiring channel serves the supply of electrical energy to the light.

2. Description of Related Art

Generally, such mounts are tubular and straight. The conduit consists of wood, plastic or metal, and its surface is often beautified electrolyticly or through painting.

Such a mount is expensive to manufacture and only hard to adjust to various desires of customers with respect to materials and surfaces. This applies especially to lights that are to be attached to pieces of furniture or inserted in wainscoting. Should the mount even have a sweeping shape to achieve baroque effects, a channel is not easily realized in the selection of wood for the conduit, and in the bending of a metal conduit, it is also hard to avoid localized narrow spots in the wiring channel.

SUMMARY OF THE INVENTION

So the task of the invention is to specify a mount with a wiring channel of constant inside width for an electric light, which can be adjusted to the various wishes of customers at low cost. This applies also particularly to bent mounts, since the bending of a wooden conduit in such a way as to result in a wiring channel of constant inside width, is hardly possible mechanically.

A mount according to the invention solves this task in that it consists of two flat cover layers and a center layer, that the center layer consists of two elements, separated parallel to the axis of the wiring channel, whose combined thickness and their distance from each other correspond with the width and high of the wiring channel respectively, and that the three layers are glued or welded together.

The axis of the wiring channel in the mount can run parallel or coaxial to the axis of the mount, or in serpentine lines, alternately to both sides of the axis of the mount.

The demand for an always constant cross section of the wiring channel is met without difficulty by the two elements of the center layer being held at a precisely defined distance from each other during the assembly. This is preferably achieved by holes in the cover layers and the two elements of the center layer that are aligned and perpendicular to the planes of the layers outside the area of the wiring channel, in which pins are put for the precisely fitted joining together of the layers.

BRIEF DESCRIPTION OF THE DRAWINGS

These and further characteristics of the invention are now explained in more detail through several implementation examples and the attached drawings.

DETAILED DESCRIPTION OF THE EXEMPLARY EMBODIMENT

Figure 1:
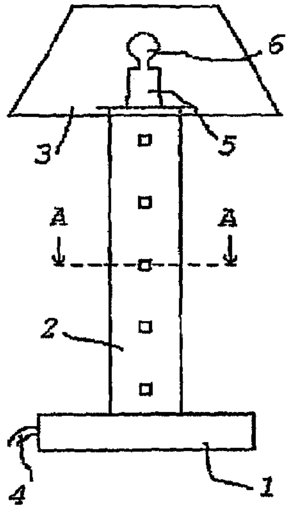
FIG. 1 shows the view of a table lamp with a mount according to the invention as base.

The light according to FIG. 1, as usual, has a Foot 1, a vertical Support 2, with a wiring channel not visible here and the usual light setup with a Shade 3. The Electrical Wire 4 is inserted through the Foot 1 into the Support 2 and ends up above in the Light Socket 5 of the Light 6.

Figure 2:
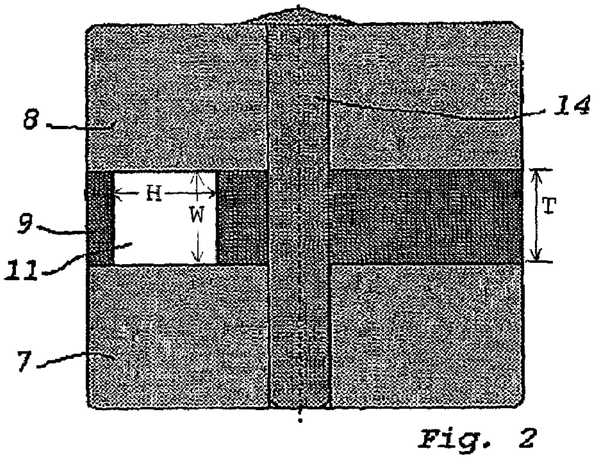
FIG. 2 shows a blown up cross section of the mount along the line A-A in FIG. 1.

FIG. 2 shows a cross section along the Line A-A in FIG. 1 through the mount according to the invention. It consists of three layers, namely two Cover Layers 7 and 8 as well as a Center Layer 9. In total, these layers form a quadratic cross section here, the corners of which can be rounded off more or less.

The thickness T of the Center Layer 9 corresponds with the inside width W of the desired wiring channel, for example 3 mm. This layer preferably consists of a material that can be cut with a computer controlled laser torch, since that results in a very accurate form of the component. The two Cover Layers 7 and 8 can consist entirely or only on the surface of any material desired by the customer.

Figure 3:
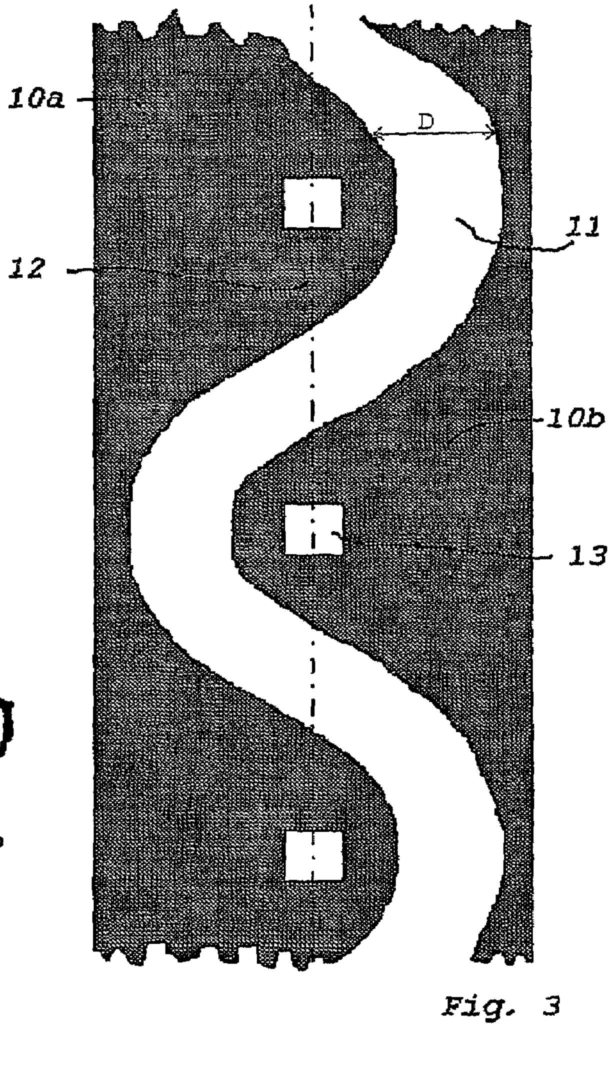
FIG. 3 shows a cutout of the center layer of the mount according to the invention according to FIG. 1.

As FIG. 3 shows, the center layer consists of two complementary Elements 10*a* and 10*b*, which have a distance D from each other in the completed state of the mount, which corresponds with the height H of the center layer. Thus, a quadratic Channel 11 results at the assembly with the cover layers, which winds around the Axis 12 of the mount. Each at the height of the greatest distance of Channel 11 from Axis 12, there is a Hole 13 exactly perpendicular to Axis 12, which runs through all three Layers 7, 8 and 9 and is quadratic for instance. If a Pin 14 is fit into these holes precisely, the two halves of the center layer are hereby fixed in exactly the correct distance to each other, so that, after the gluing together of the three layers, the Wiring Channel 11 has exactly the predetermined inside cross section. The three layers can then positioned exactly relative to each other without other fastening aids and glued or welded such. Alternatively, the Holes 13 can also only go entirely through the center layer, while they are blind holes open to the inside in the cover layers.

If the layers are to be welded together, it is recommended that the center layer is cut somewhat narrower than the cover layers, so that a welding channel is formed on two sides parallel to Axis 12 of the mount, which is then filled with welding stock. After a grinding treatment, it works like an intarsia between the cover layers.

To facilitate the threading of the electrical wiring into longer mounts, it is wise to put a drawstring into the space between the two elements of the center layer at assembly. If the electrical wiring can withstand the temperatures at the assembly of the three layers, as is the case especially with gluing, it can be put directly into the still open channel.

As material for the cover layers, wood, metal, marble, plastic or glass can be considered, which are all shaped nowadays with computer controlled milling machines. Metals, plastics and even wood are possibilities for the center layer.

The Pins 14 in the Holes 13 serve primarily the precise positioning of the three layers relative to each other during assembly. But they can also be supports of ornaments by having an ornamental head for example.

Figure 4:
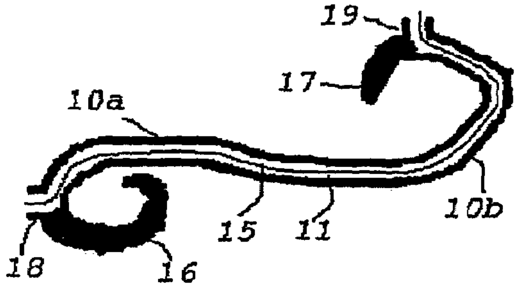
FIG. 4 shows the center layer of a sweeping mount for a wall light.

The invention can not only be used with straight mounts for lights, but is especially advantageous with ornamentally bent mounts for lights that can otherwise only be produced by hand. FIG. 4 shows the view of the intermediate layer of such a mount with the Wiring Channel 11 and an Electrical Wire 15 running through it. The Wiring Channel doesn't necessarily have to wind around the center axis of the mount if, for example, there are positioning pins at the edge or the precise positioning of the two elements of the center layer is ensured another way.

As above, the center layer consists of two elements that form a wiring channel between them. The two elements are not necessarily exactly alike anymore, because each element can have ornamental elements or only fastening mechanisms for such elements, for example Processes 16 and 17 beyond the orifices of the wiring channel if a wiring channel is no longer required at the two ends, because the wall connection at 18 and the light fixture at 19 are not at the respective ends of the mount anymore as in the execution according to FIG. 1. Also, one or both elements of the center layer can be allowed to protrude at the outside beyond the cover layers, where the protruding area is designed decoratively, e.g. as flower, or only forms eyes at which glass prisms or balls can be hung. The fastening of the mount to a (not shown) base plate at the wall as well as the fastening of the light fixture and the lampshade at the open end of the mount, can take place through suitable metal plates, which are fastened at the two cover layers at 17 and 18, or through hook type extensions of at least one of the intermediate layers at the end of the mount.

The invention is not limited to the illustrated execution examples in particular. So the Pass-Through Holes 13 can be omitted for example, as was indicated by FIG. 4, if the relative position of the two elements of the center layer is ensured to be sufficiently precise another way during assembly. In addition, the mount can also be a structural part of a piece of furniture, which isn't outwardly distinct from the other structural parts, but has a wiring channel to feed a light. Because of the possibilities of computer controlled automatic cutting machines, complicated forms and quadratic holes can also be produced and reproduced very precisely, which by hand is either not possible at all or only at high expense.

The invention claimed is:

1. A mount for an electric light, comprising:

two flat cover layers, and a center layer, the center layer including two elements separated parallel to form a rectangular wiring channel, wherein a thickness of the center layer can be adjusted to provide a desired width of the wiring channel, and wherein the three layers are connected together.

2. The mount according to claim 1, wherein the axis of the wiring channel running parallel in the mount, in particular coaxially to the axis of the mount.

3. The mount according to claim 1, wherein the axis of the wiring channel running snakelike alternately at both sides of the axis of the mount.

4. The mount according to claim 1, wherein the cover layers and the two elements of the center layer having holes that are aligned with each other and perpendicular to the planes of the layers outside of the area of the wiring channel, into which pins are put for the precise fitting together of the layers.

5. The mount according to claim 4, wherein the holes being arranged at regular intervals along the axis of the mount and the wiring channel winding around the holes in both directions snakelike.

6. A process for the manufacture of the mount according to claim 1, wherein the cover layers and the two elements of the center layer are cut out according to the desired form of the mount, wherein in the assembly, the electrical wiring or a drawstring for the later pulling in of the electrical wire is inserted into the wiring channel, and wherein the three layers are then firmly bonded with each other.

* * * * *